United States Patent [19]

Chen

[11] Patent Number: 5,787,361

[45] Date of Patent: Jul. 28, 1998

[54] COUPLING PLATE FOR MOUNTING A BATTERY PACK ONTO A CELLULAR PHONE

[76] Inventor: Sung-chin Chen, 1st Fl., No. 19, Lane 456, Chilin Rd., Taipei, Taiwan

[21] Appl. No.: 634,922

[22] Filed: Apr. 19, 1996

[51] Int. Cl.[6] .................... H04Q 7/00; H01M 2/10
[52] U.S. Cl. ............... 455/550; 455/90; 429/97; D13/120; D14/140; D14/240
[58] Field of Search ............ 455/550, 90; 379/447, 379/457, 433, 428, 434, 451; 429/97; D13/119, 120; D14/138, 140, 142, 217, 240; 439/352–354

[56] References Cited

U.S. PATENT DOCUMENTS

| | | | |
|---|---|---|---|
| 4,904,549 | 2/1990 | Goodwin et al. | 429/97 |
| 5,242,767 | 9/1993 | Roback et al. | 429/97 |
| 5,308,716 | 5/1994 | Shababy et al. | 429/97 |
| 5,314,763 | 5/1994 | Aksoy et al. | 429/97 |
| 5,535,437 | 7/1996 | Karl et al. | 455/90 |
| 5,604,050 | 2/1997 | Brunette et al. | 429/97 |
| 5,642,404 | 6/1997 | Hsu | 455/90 |

Primary Examiner—Dwayne D. Bost
Assistant Examiner—Tracy M. Legree
Attorney, Agent, or Firm—Dorsey & Whitney LLP

[57] ABSTRACT

A fixation arrangement for detachably mounting a battery pack onto a cellular phone includes two parallel guide rails defined on the cellular phone, a sloping depression defined between the guide rails and sloping outward to the guide rails, a recess defined adjacent to the sloping depression and in a position opposite to the sloping direction of the depression, and a coupling plate integrally formed with the battery pack and having two parallel lips corresponding to the guide rails for slidably engaging onto the cellular phone, a U-shaped slot provided in a position corresponding to the recess and the slot and defining a tongue portion with a tip over the slot when the battery pack is engaged with the cellular phone, a tab protruding from the tip of the tongue portion for inserting into the slot when the battery pack is engaged with the cellular phone, and two cutouts respectively extending between one of the lips and the U-shaped slot and in a direction substantially parallel to the guide rails.

1 Claim, 4 Drawing Sheets

COUPLING PLATE FOR MOUNTING A BATTERY PACK ONTO A CELLULAR PHONE

BACKGROUND OF THE INVENTION

1. Field of the Invention

The present invention relates to a cellular phone battery pack, and particularly to a coupling plate for mounting a battery pack onto a cellular phone.

2. Description of the Prior Art

A cellular phone is a commonly-used communication apparatus in modern society. The cellular phone requires a battery pack which is easily detachable from the cellular phone for charging when the battery pack's power is exhausted. FIG. 3 illustrates a conventional cellular phone 40 with a battery pack 50 (partially shown in phantom lines) detached therefrom. A coupling plate 52 is integrally formed with the battery pack 50 for securing the battery pack 50 onto the cellular phone 40. The cellular phone 40 defines a pair of parallel guide rails 42, 44 on a back portion thereof. The coupling plate 52 is rectangular in shape with two parallel long edges and two short edges. Two lips 54, 56 respectively extend at right angles from the long edges toward the cellular phone 40 for slidably engaging with the guide rails 42, 44.

The cellular phone 40 further defines a sloping depression 46 and a recess 48 between the guide rail 42, 44. The sloping depression 46 slopes toward a top of the cellular phone 40 and the recess 48 is defined under the sloping depression 46. A T-shape plate 60, defining a horizontal block 62 and a vertical plate 64, is secured onto the coupling plate 52 by an integrally-formed rod 58 extending across an intersecting portion of the horizontal block 62 and the vertical plate 64 in a location of facing the sloping depression 46 and the recess 48. As shown in FIG. 4, the vertical plate 64 further defines a tab 66 extending toward to the cellular phone 40 for inserting into the recess 48 so as to secure the battery pack 50 in place when the lips 54, 56 (in FIG. 3) of battery pack 50 engage with the guide rails 42, 44 (in FIG. 3) and slide from a bottom to the top of the cellular phone 40. A user can remove the battery pack 50 from the cellular phone by pressing the horizontal block 62 into the sloping depression 46 and forcing the tab 66 out of the recess 48 then moving the battery pack 50 downward.

Referring back to FIG. 3, as the rod 58 is integrally formed with the coupling plate 52 and there are merely two ends (P shown in FIG. 3) of the rod 58 are connected with the coupling plate 52, the rod 58 will be easily broken from the plate 52 when the user presses the horizontal block 62.

In view of the above situation, the above-mentioned coupling plate 52 is improved by coating a metal layer onto the rod 58 as to increase the strength of the rod 58, however, such a process has additionally increased the cost of this product.

SUMMARY OF THE INVENTION

An object of the present invention is to provide an engaging arrangement to overcome the disadvantage in the above arrangement.

According to the present invention, a fixation arrangement for detachably mounting a battery pack onto a cellular phone includes two parallel guide rails defined on the cellular phone, a sloping depression defined between the guide rails and slopping outward to the guide rails, a recess defined adjacent to the sloping depression and in a position opposite to the sloping direction of the depression, and a coupling plate integrally formed with the battery pack and having two parallel lips corresponding to the guide rails for slidably engaging onto the cellular phone, a U-shaped slot provided in a position corresponding to the depression and defining a tongue portion with a tip over the recess when the battery pack is engaged with the cellular phone, a tab protruding from the tip of the tongue portion for inserting into the recess when the battery pack is engaged with the cellular phone, and two cutouts respectively extending between one of the lips and the U-shaped slot and in a direction substantially parallel to the guide rails.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
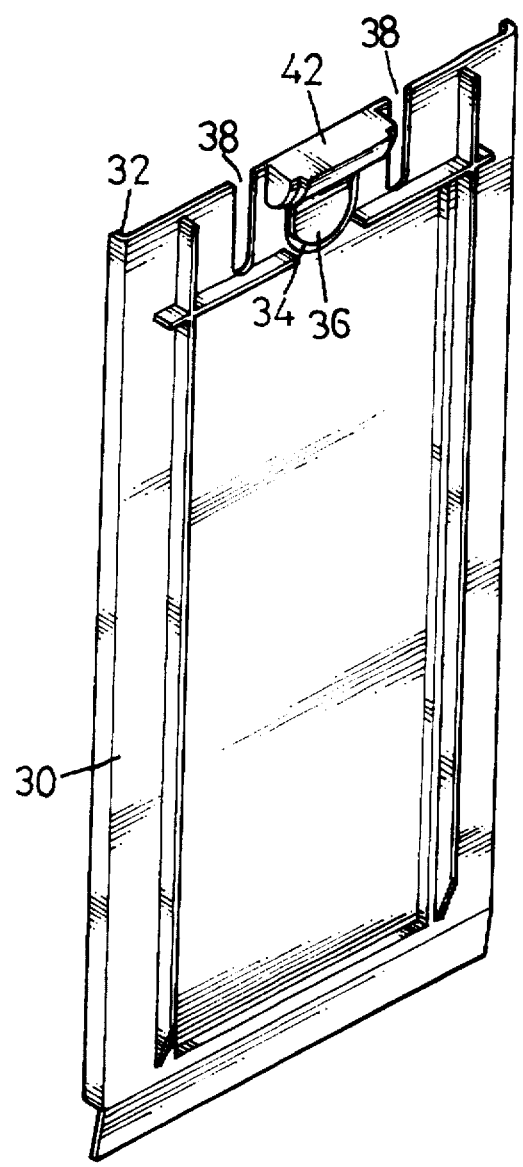
FIG. 1 is a perspective view of the coupling plate of the present invention.

Referring now to the drawings wherein like reference characters designate identical or corresponding parts through the several views.

The cellular phone for the present invention has an identical structure as mentioned in the DESCRIPTION OF THE PRIOR ART, therefore, a corresponding description is omitted for the briefness of the specification.

Referring to FIG. 1, there is shown a perspective view of a coupling plate 30 in accordance with the present invention. The coupling plate 30 has two parallel lips 32 for engaging with the guide rails in the cellular phone as mentioned in the DESCRIPTION OF THE PRIOR ART, a U-shaped slot 34 defined in a substantially intermediate portion between the parallel lips 32 as to define a tongue 36, two cutouts 38 respectively provided between the U-shaped slot 34 and the lips 32, a tab 39 (in FIG. 2) protruding from a tip of the tongue 36 for inserting into the recess 48 (in FIG. 3) in the cellular phone 40 (in FIG. 3), and a block 42 provided above the U-shaped slot 34 for a user to press into the depression 46 (in FIG. 3) and subsequently force the tab 39 out of the recess 48.

Figure 2:
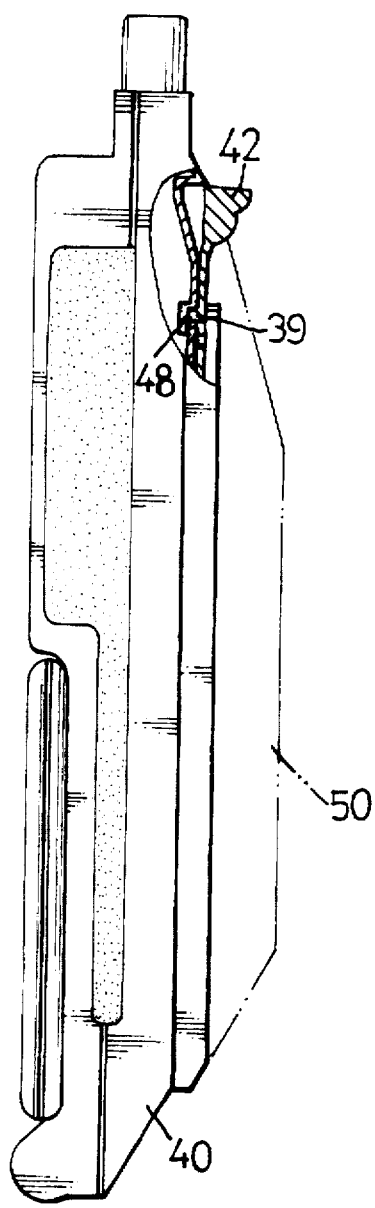
FIG. 2 is a partially cross-sectional view showing the cellular phone and the battery pack in an assembled state.
Figure 3:
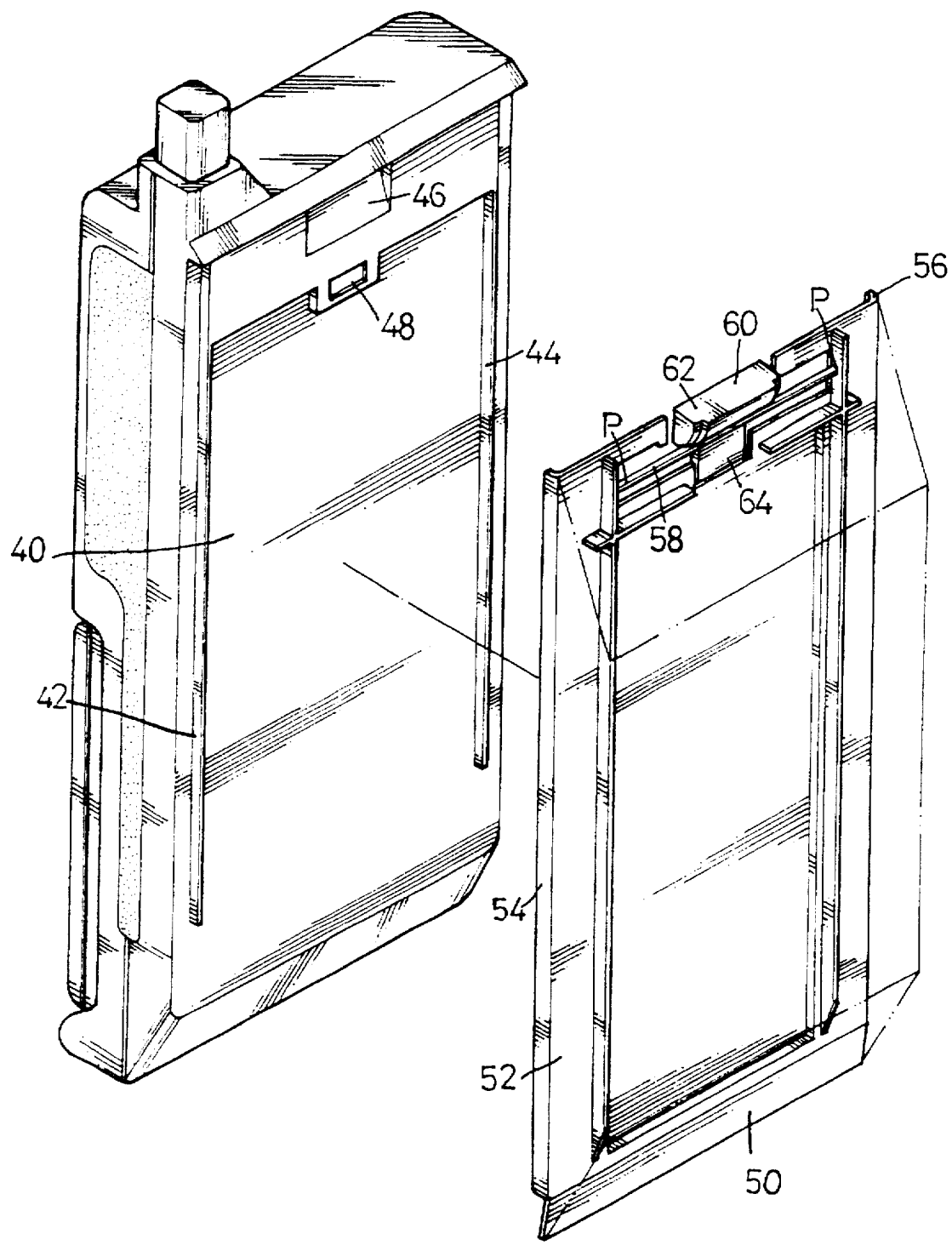
FIG. 3 is a perspective exploded view illustrating a cellular phone and a conventional coupling plate.
Figure 4:
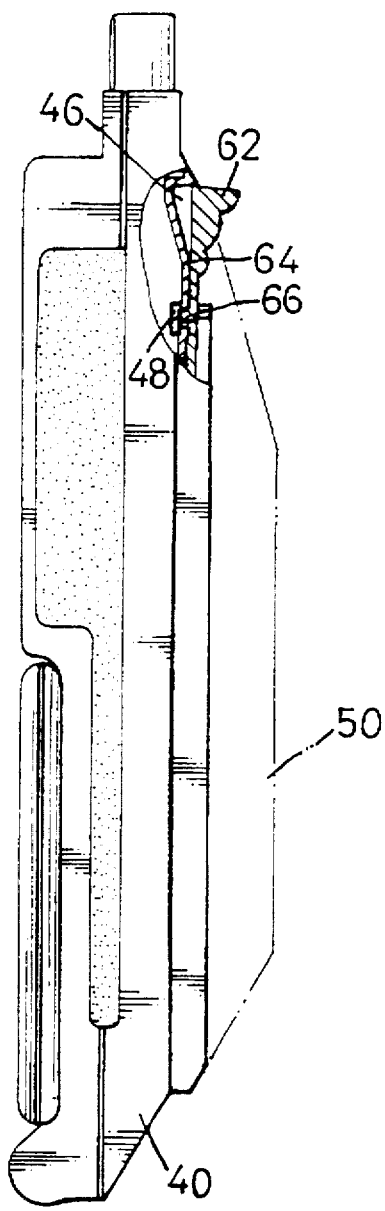
FIG. 4 is a partially cross-sectional view showing the cellular phone and the battery pack of FIG. 3 in an assembled state.

As shown in FIG. 2, the battery pack 50 is in combination with the cellular phone 40, the tab 39 is inserted into the recess 48 for securing the battery pack 50 in place. When the battery pack 50 requires charge, the user can push the block 42 and push the battery pack 50 downward thereby detaching the battery pack 50 from the cellular phone 40.

Although the invention has been explained in relation to its preferred embodiment, it is to be understood that many other possible modifications and variations can be made without departing from the spirit and scope of the invention as hereinafter claimed.

I claim:

1. A fixation arrangement for detachably mounting a battery pack onto a cellular phone, comprising:

two parallel guide rails defined on the cellular phone;

a sloping depression defined between the guide rails and sloping outward to the guide rails;

a recess defined adjacent to the sloping depression and in a position opposite to the sloping direction of the depression; and a coupling plate integrally formed with the battery pack and having two parallel lips corresponding to the guide rails for slidably engaging onto the cellular phone, a U-shaped slot provided in a position corresponding to the depression and the recess and defining a tongue portion with a tip over the recess when the battery pack is engaged with the cellular phone, a tab protruding from the tip of the tongue portion for inserting into the recess when the battery pack is engaged with the cellular phone, and two cutouts respectively extending between one of the lips and the U-shaped slot and in a direction substantially parallel to the guide rails.

* * * * *